(12) United States Patent
Shackleton et al.

(10) Patent No.: US 7,558,308 B2
(45) Date of Patent: Jul. 7, 2009

(54) HIGH POWER LOW INDUCTANCE RF HERMETIC SEALED FEED-THROUGH FOR SLAB CO2 LASERS

(75) Inventors: Christian J. Shackleton, Los Gatos, CA (US); Thomas J. Hennessey, Jr., Lebanon, CT (US); Vernon Seguin, Windsor, CT (US); Frederick W. Hauer, Windsor, CT (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 12/069,939

(22) Filed: Feb. 14, 2008

(65) Prior Publication Data

US 2008/0205473 A1 Aug. 28, 2008

Related U.S. Application Data

(60) Provisional application No. 60/902,967, filed on Feb. 23, 2007.

(51) Int. Cl.
*H01S 3/22* (2006.01)

(52) U.S. Cl. .............................. 372/55; 372/57; 372/65

(58) Field of Classification Search .................. 372/55, 372/57
See application file for complete search history.

(56) References Cited

U.S. PATENT DOCUMENTS 5,155,739 A * 10/1992 Mefferd .................... 372/107
5,412,682 A * 5/1995 Laudenslager et al. ........ 372/65
5,684,814 A * 11/1997 Hollins et al. ............. 372/38.05

OTHER PUBLICATIONS

International Telephone and Telegraph Corporation, *Reference Data for Radio Engineers*, section entitled "Transmission Lines," under caption "Characteristic impedance of lines," copyright 1956 (4th edition), p. 589.

* cited by examiner

*Primary Examiner*—Dung T Nguyen
(74) *Attorney, Agent, or Firm*—Morrison & Foerster LLP

(57) ABSTRACT

A low inductance, hermetically sealed, RF shielded feed-through is provided for exciting low impedance discharges associated with high power $CO_2$ slab lasers. The feed-through mechanically obtains RF contact, preferably, at the center of the length of the electrodes that are inserted within the long laser housing, thereby making it easier to obtain a uniform electric field distribution along the length of the electrodes.

9 Claims, 3 Drawing Sheets

HIGH POWER LOW INDUCTANCE RF HERMETIC SEALED FEED-THROUGH FOR SLAB CO2 LASERS

PRIORITY CLAIM

This application claims priority from U.S. Provisional Application No. 60/902,967, filed Feb. 23, 2007, titled "High Power Low Inductance RF Hermetic Sealed Feed-Through for Slab $CO_2$ Lasers." Provisional Application No. 60/902,967 is hereby incorporated by reference herein in its entirety.

FIELD OF THE INVENTION

The present invention relates generally to carbon dioxide ($CO_2$) slab lasers and, in particular, to techniques for obtaining a low inductance, hermetically sealed, RF shielded feed-through for exciting low impedance discharges associated with high power $CO_2$ slab lasers.

BACKGROUND OF THE INVENTION

The low impedance (e.g., around several ohms) of high power $CO_2$ slab laser discharges that are energized by RF frequencies in the neighborhood of 100 MHz places electrical constraints on the hermetically sealed RF feed-through connecting the solid state RF power supply to the parallel electrodes inside the laser tube housing. In order to reduce the circulating currents to a minimum and to have a fast rise time (e.g., below 0.1 microsec. at about 100 MHz) in pulsing the discharge, low series inductance is desired for the RF feed-through. The function of the RF feed-through is to deliver fast rise time, high RF power pulses (e.g., having peak powers of a few thousand watts to over 20,000 watts of RF power to a $CO_2$ laser having several hundred watts to 1000 W of output IR average output power, respectfully) into a laser discharge within a hermetically sealed metal "tube" chamber without emitting stray RF radiation into the atmosphere. This tube chamber contains the appropriate gas mixture of $CO_2$:$N_2$:He, etc., at below atmospheric pressure (i.e., typically between 60-150 Torr), the mirrors forming the laser's optical resonator, and the two long parallel facing metal electrodes between which the laser's discharge is generated. Depending upon the laser power desired, the gap between the two parallel facing electrodes and the width and the length dimensions of the electrodes varies with the desired output power of the laser, gas pressure, the RF frequency, the gas temperature, etc. For a 500 W $CO_2$ slab laser, the electrode length is in the neighborhood of 800 mm. and the width is typically slightly larger than one tenth ($\frac{1}{10}$) of the length. The laser tube has a rectangular or cylindrical configuration, typically fabricated from aluminum. For a 500 W laser, the open ends of the laser tube are typically of the order of 150 mm. The distance between the mirrors of the resonator is slightly longer than the length of the electrodes. For an electrode length of approximately 800 mm, the distance between the mirrors is approximately 870 mm.

From uniform discharge considerations, it is desirable to have the electrical RF contact made by the hermetically sealed feed-through to the electrodes occur at the center of the length of the electrode. The small aspect ratio of the contact opening to the length of the laser tube housing makes this contact mechanically difficult to accomplish. Consequently, as disclosed in commonly-assigned U.S. Pat. No. 5,155,739, RF contact has been made to one end of the electrode pair by placing the feed-through at one of the end flanges of the laser housing tube.

SUMMARY OF THE INVENTION

The present invention provides techniques for obtaining a low inductance, hermetically sealed, RF shielded feed-through for exciting low impedance discharges associated with high power $CO_2$ slab lasers. The invention further provides techniques for mechanically obtaining RF contact at the center of the length of the long electrodes that are inserted within the long laser housing, thereby making it easier to obtain a uniform electric field distribution along the length of the electrodes.

The features and advantages of the various aspects of the present will be more fully understood and appreciated upon consideration of the following detailed description of the invention and the accompanying drawings, which set forth illustrative embodiments in which the concepts of the invention are utilized.

DETAILED DESCRIPTION OF THE INVENTION

Figure 1:
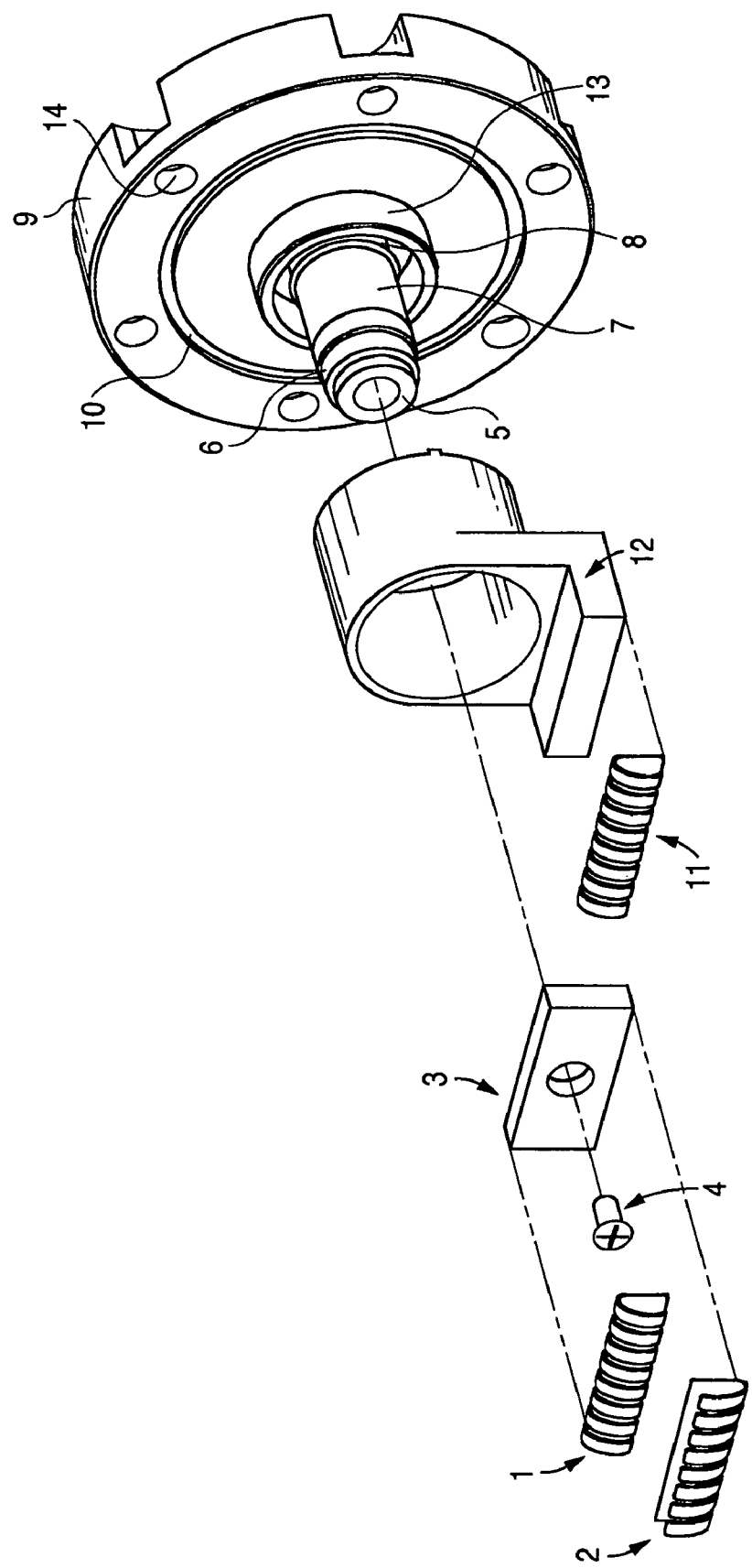
FIG. 1 is an exploded isometric view illustrating a high power, low inductance, RF, hermetically sealed feed-through in accordance with the present invention.

FIG. 1 shows an exploded isometric view of a high power, low inductance, RF, hermetically sealed feed-through used to connect RF power from external to the laser tube housing to the discharge electrodes within the laser tube housing. The exploded isometric view is shown looking out toward one of the side walls (not shown in FIG. 1) from inside the laser tube's hermetically sealed housing onto which a metal flange 9 is bolted. The metal tube housing serves as RF ground. Moving from left to right in FIG. 1, two RF contacting springs 1 and 2 are used to make electrical contact to the edge surfaces of the hot electrode. The contact to the electrode is preferably made at the center of the length of the electrode. Springs 1 and 2 are attached to a Nickel plated rectangular Copper plate 3. The attachment can be made, for example, by soldering springs 1 and 2 to the Copper plate 3 with a 95% Sn: 5% Sb solder. The combined assembly of springs 1 and 2 and Copper plate 3 is attached by a screw 4 to a Nickel plated disk 5 that is in electrical contact with a Kovar cap 6 which is, in turn, connected to a Copper rod (shown as item 15 in FIG. 3) that extends through the center of the protrusion consisting of a ceramic insulator 7 to a Kovar metal (items 6 and 8) hermetic seal. The assembly of the metal to ceramic hermetically sealed feed-through comprises the hot RF Nickel plated Copper disk contact 5, the Kovar (6, 8) sealed to the ceramic 7, and the metal flange 9. Metal flange 9 is preferably bolted onto a wall of the metal laser tube housing (not shown) by six bolts (not shown) inserted through the six holes 14 formed in the flange. The metal flange 9 serves as an electrical ground when bolted onto the laser tube metal housing.

The feed-through assembly in this embodiment of the invention is preferably a modified brazed metal to ceramic hermetically sealed feed-through provided by Ceram Tech of North Carolina, U.S.A. (Part Number Cerama Seal 6700-01-

CF). One modification that was made to this standard part was to have a specific length for the protrusion into the laser tube housing to accommodate the distance from outside the laser tube to the edge surface of the hot electrode so that springs 1 and 2 are compressed against the edge surface of the hot electrode to provide a good RF contact.

As shown in FIG. 1, another modification that was made to this standard part was to have a "lip" 13 machined in the stainless steel flange 9 that also protrudes past the inside surface of the laser tube housing. An "O"-ring recess 10 is provided to maintain the hermetically sealed condition of the laser tube housing when the RF feed-through metal to ceramic flange assembly is bolted onto an outside surface of the laser tube housing.

A Nickel plated Aluminum RF shield 12 is press fitted over the stainless steel lip 13 to ensure a good electric contact between the shield 12 and the lip 13. The RF shield 12 serves as the outer ground conductor of a short co-axial transmission line the characteristic impedance of which is designed to match the input impedance of the laser discharge, as well as the output impedance of the impedance matching network that feeds RF power from external to the laser tube housing to the laser discharge within the hermetically sealed laser housing. This short co-axial cable structure is responsible for the low series inductance characteristics of this RF feed-through design. The design of such a co-axial transmission line to obtain a given impedance is well known to those experienced in the RF state of the art, as exemplified by Fig. A on page 589 of the 4th edition of "RF Data for Radio Engineers", published by the IT&T Corp., 1956.

As shown in FIG. 1, a spring 11 is also attached to the RF shield 12 and serves as the RF ground when pressed against the edge surface of the ground electrode. The length of the shield assembly is designed so that when assembled, the surfaces of springs 1, 2 and 11 are the same distance from and perpendicular to a common flat surface, namely the edge surfaces of the hot and ground electrodes.

Figure 2:
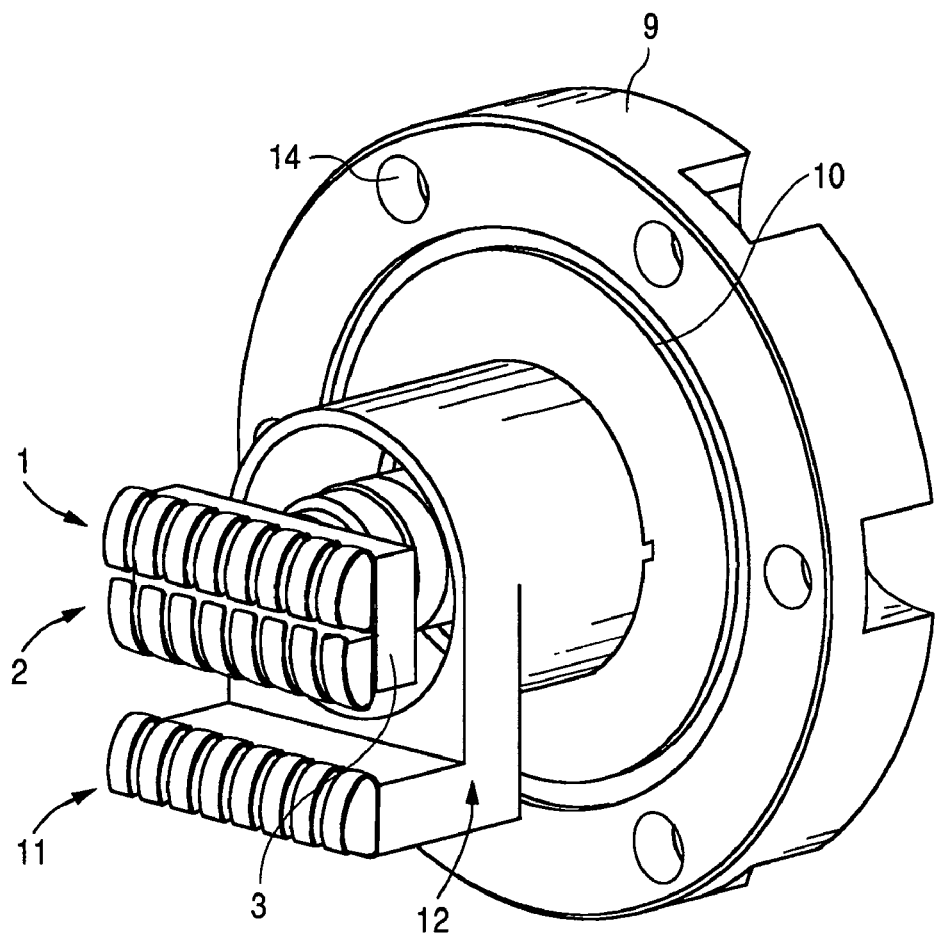
FIG. 2 is an assembled view of a high power, low inductance, RF, hermetically sealed feed-through in accordance with the present invention from the inside of the laser tube housing.

The diameter of the opening cut into the laser tube housing is selected to be larger than the outside diameter of the shield 12 that is press fitted over the stainless steel lip 13, but smaller than the inside diameter of the O-ring recess 10 so that an hermetical seal can be maintained, FIG. 2 shows the assembled high power, low inductance RF feed-through of FIG. 1 from the inside of the laser tube housing.

Figure 3:
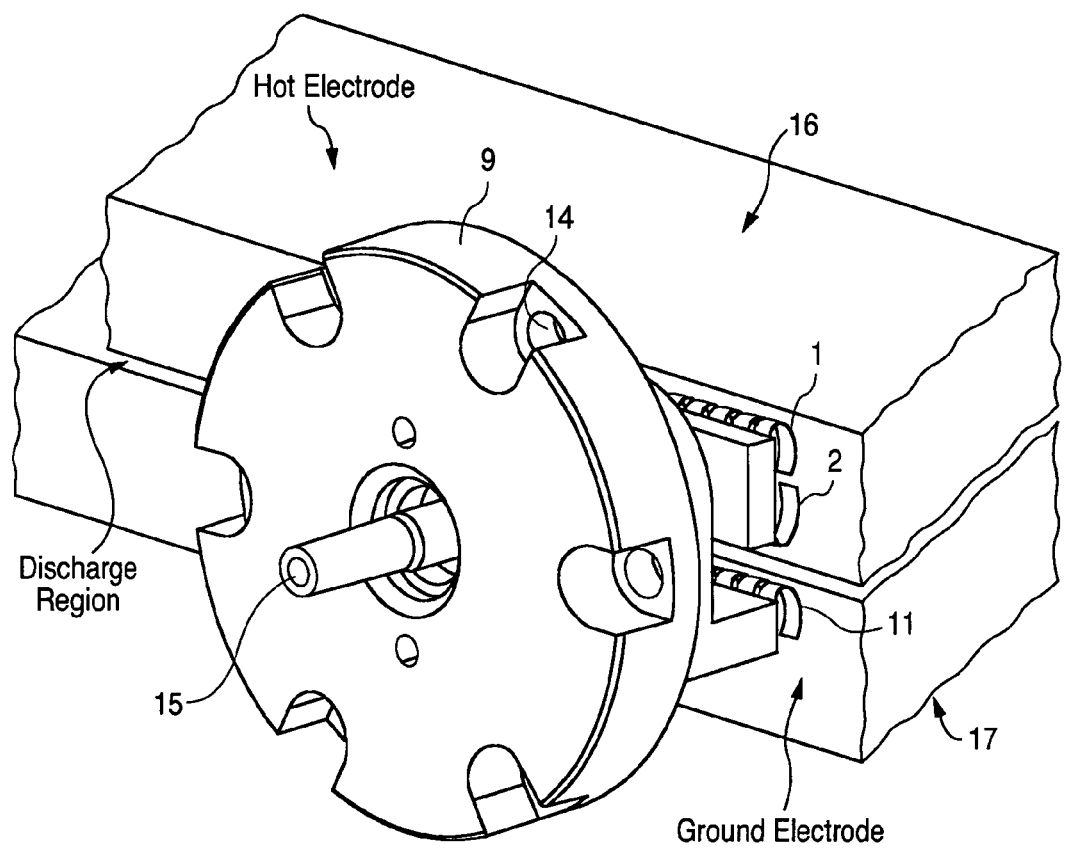
FIG. 3 is an assembled view of a high power, low inductance, RF, hermetically sealed feed-through in accordance with the present invention from the outside looking in to the laser tube housing.

FIG. 3 shows the assembled hermetically sealed, high power, low inductance, RF feed-through of FIG. 1 from the outside looking in to the laser tube housing. Item 15 in FIG. 3 is the hot Copper center conductor the opposite end of which is attached to item 5 of FIG. 1. Note that FIG. 3 shows that the springs 1 and 2 and 11 are pressed against the thin sides of the hot electrode 16 and the ground electrode 17, respectively, thereby providing easy RF contact through a side of the laser tube housing to the middle of the length of the electrodes.

It should be understood that the particular embodiments of the invention described above have been provided by way of example and that other modifications may occur to those skilled in the art without departing from the scope and spirit of the invention as expressed in the appended claims and their equivalents.

What is claimed is:

1. A hermetically sealed RF feed-through for a slab laser, the laser including a laser housing having an exterior wall and defining a housing interior, first and second elongated electrodes disposed within the housing interior to be space apart and face-to-face to define a pair of spaced apart electrode edges, the first and second electrodes defining a gap therebetween for containing a lasing gas, the feed-through comprising:

a flange mountable on an exterior wall of the laser housing, the flange having an opening formed therein that corresponds to an opening formed in the exterior wall of the laser housing when the flange is mounted on the exterior wall;

an O-ring recess formed in an inner surface of the flange for receiving an O-ring that provides a hermetic seal between the inner surface of the flange and the exterior wall of the laser housing;

a flange lip formed around the perimeter of the opening in the flange and extending through the opening in the exterior wall of the housing and into the housing interior;

a conductive rod having first and second ends, the first end being connectable to an RF power supply, the second end extending through the opening in the flange such that the flange lip surrounds but is spaced apart from the conductive rod;

a conductive spring assembly connected to the second end of the conductive rod, the conductive rod extending into the housing interior a length such that the spring conductive spring assembly is urged into electrical contact with the edge of the first electrode when the flange is mounted on the exterior wall of the laser housing; and a conductive shield assembly connected to the flange lip, the shield assembly including a first conductive spring that is urged into electrical contact with the edge of the second electrode when the flange is mounted on the exterior wall of the laser housing.

2. The feed-through of claim 1, wherein the first and second electrodes are of equal length, the conductive spring assembly and the first spring being in electrical contact with the center of the length of the first and second electrodes, respectively.

3. The feed-through of claim 1, wherein the second end of the conductive rod comprises a copper rod having a metal cap attached thereto, a ceramic insulator being formed around the metal cap.

4. The feed-through of claim 3, wherein the shield assembly comprises a nickel plated aluminum RF shield that is fitted over the flange lip, the first spring being attached to the RF shield.

5. The feed-through of claim 1, wherein the conductive spring assembly comprises first and second conductive springs attached to a nickel plated copper plate that is attachable to the second end of the conductive rod.

6. The feed-through of claim 1, wherein the pair of electrode edges are formed in a common plane.

7. A slab laser comprising:

a laser housing having an exterior wall and defining a housing interior;

first and second elongated electrodes disposed within to be spaced apart and face-to-face to define first and second electrode edges, the first and second spaced apart electrodes defining a gap therebetween for containing a lasing gas;

a flange mounted on the exterior wall of the laser housing, the flange having an opening formed therein that corresponds to an opening formed in the exterior wall;

an O-ring recess formed in an inner surface of the flange and extending around the flange opening;

an O-ring disposed in the O-ring recess to provide a hermetic seal between the inner surface of the flange and the exterior wall;

a flange lip formed around the perimeter of the flange opening and extending through the opening in the exterior wall and into the housing interior;

a conductive rod having first and second ends, the first end being connected to an RF power supply, the second end extending trough the flange opening and extending through the opening in the exterior wall and into the housing interior such that the flange lip surrounds but is spaced apart from the conductive rod;

a conductive spring assembly connected to the second end of the conductive rod and disposed in electrical contact with the first electrode edge;

a conductive shield assembly connected to the flange lip and disposed in electrical contact with the second electrode edge.

8. The slab laser of claim 7, wherein the conductive spring assembly is in electrical contact with the center of the length of the first electrode edge; and the conductive shield assembly is in electrical contact with the center of the length of the second electrode edge.

9. The slab laser of claim 7, wherein the first and second electrode edges are formed in a common plane.

* * * * *